United States Patent [19]

Sheldrake et al.

[11] 4,034,398

[45] July 5, 1977

[54] OPTICAL AND MECHANICAL IMPROVEMENTS FOR TELEVISION PROJECTION SYSTEM

[75] Inventors: Charles Peter Hedley Sheldrake; Timothy Gunton Blake, both of St. Peter Port, Guernsey, Channel Islands

[73] Assignee: Electro-Optiek, N.V., Curacao, Netherlands Antilles

[22] Filed: Sept. 15, 1975

[21] Appl. No.: 613,089

[30] Foreign Application Priority Data

Aug. 27, 1975 United Kingdom ............. 35428/75.

[52] U.S. Cl. .............................. 358/60; 313/474; 313/476; 358/250
[51] Int. Cl.² ..................... H04N 5/74; H04N 9/31; H01J 29/18; H01J 31/10
[58] Field of Search ................ 358/56, 60, 61, 62; 313/474, 476, 482; 178/7.5 D, 7.88, 7.89; 350/189

[56] References Cited

UNITED STATES PATENTS

| | | | |
|---|---|---|---|
| 2,520,190 | 8/1950 | Amdursky | 313/476 |
| 2,637,829 | 5/1953 | Trad | 313/476 |
| 2,730,925 | 1/1956 | Kavanagh | 350/189 |
| 2,999,126 | 9/1961 | Harries et al. | 358/60 |
| 3,969,648 | 7/1976 | Hergenrother et al. | 358/60 |

Primary Examiner—John C. Martin
Attorney, Agent, or Firm—Morse, Altman, Oates & Bello

[57] ABSTRACT

Interrelated optical, mechanical and electronic improvements are incorporated in a television projection system comprising a plurality of color separation assemblages, each including cathode ray components and projection optics components, certain of which are enclosed with a cathode ray tube. These improvements specifically involve optical mounts of particular construction, optical surfaces of particular configuration and electronic materials of particular composition.

16 Claims, 6 Drawing Figures

OPTICAL AND MECHANICAL IMPROVEMENTS FOR TELEVISION PROJECTION SYSTEM

BACKGROUND OF THE INVENTION

1. Field of the Invention

The present invention relates to the optical projection of television images and, more particularly, to television projection systems of the type characterized by a plurality of color separation assemblages (typically red, green and blue), each incorporating cathode ray and projection optics components, certain of which are enclosed within a cathode ray tube. These color separation assemblages register enlarged color separation images on a viewing screen for visual fusion by observers.

2. The Prior Art

Various systems have been proposed for projecting and enlarging video images.

In one such system, the real image generated in a television tube with a conventional, three color shadow mask is imaged by a single optical assemblage. It is known that the information bearing area of a conventional cathode ray tube is reduced by more than 50% of its theoretical maximum in the presence of a three color shadow mask. The shadow mask effectively serves to isolate the color separation dots that are needed in a single television tube to produce a multicolor image but undesirably introduces shadowed interstices that contribute no information. The resulting composite image is characterized by unduly low resolution and contrast.

In another such system, three distinct color separation assemblages generate and project red, green and blue color separation images for registration on the viewing screen. catadioptric color separation assemblage includes, in axial alignment: a forwardly directed electron gun; a rearwardly directed phosphor target; a forwardly directed centrally apertured positive mirror that is positioned between the gun and the target; and a correcting lens that is positioned forwardly of the target. The gun, mirror and target are mounted within a cathode ray tube. The correcting lens is positioned outside the cathode ray tube. The mirror and correcting lens constitute a Schmidt optical system. Here image degradation has been caused by optical mounts that are unduly difficult to adjust precisely and that unduly block portions of the cathadioptric field, optical surface configurations that do not cooperate optimally, and phosphor target constructions having energization response characteristics that unduly vary in time.

SUMMARY OF THE INVENTION

The object of the present invention is to provide an improved television projection system characterized by a plurality of (typically three) improved color separation assemblages, each including, in axial alignment: a forwardly directed electron gun; a rearwardly directed phosphor target; a forwardly directed, centrally apertured positive mirror that is positioned between the gun and the target; and a correcting lens that is positioned forwardly of the target; the gun, target and mirror being related within a cathode ray tube by mechanical mounts of improved construction; the correcting lens optionally being outside the cathode ray tube or at the cathode ray tube face; the mirror and the correcting lens optionally constituting a catadioptric objective of improved configuration; the target having an improved structure; and critical interrelationships among the color separation assemblages being achieved by virtue of the aforementioned improvements.

Other objects of the present invention will in part be obvious and will in part appear hereinafter.

The invention accordingly comprises the system, its components and their interrelationships, which are exemplified in the present disclosure, the scope of which will be indicated in the appended claims.

BRIEF DESCRIPTION OF THE DRAWINGS

For a fuller understanding of the nature and objects of the present invention, reference is made to the following specification, which is to be taken with the accompanying drawings, wherein.

DETAILED DESCRIPTION OF THE PREFERRED EMBODIMENT — FIGS. 1 AND 2

Figure 1:
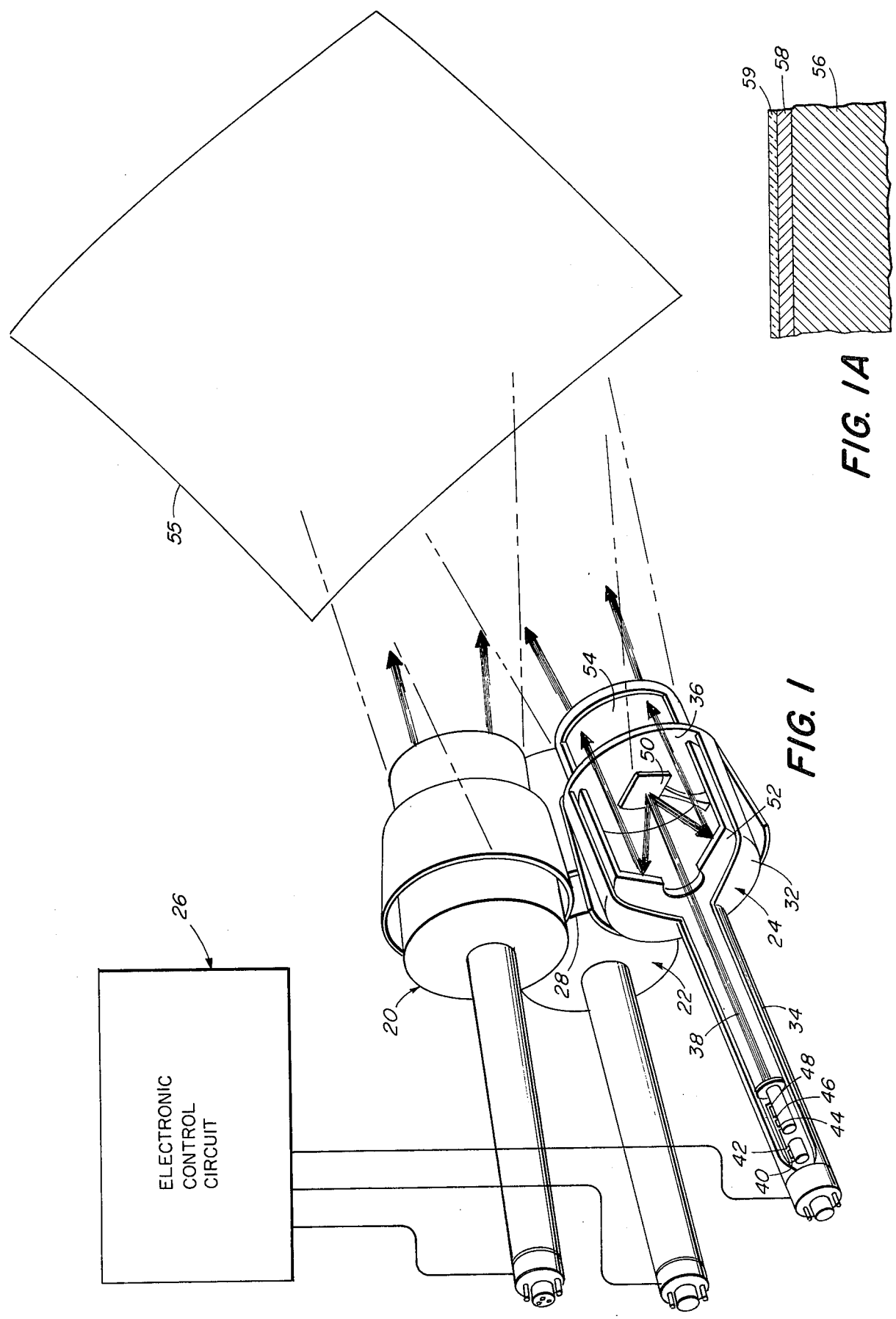
FIG. 1 is a eiagrammatic view, partly in electrical schematic and partly in mechanical perspective, broadly illustrating a system of three color separation assemblages embodying the present invention.
Figure 2:
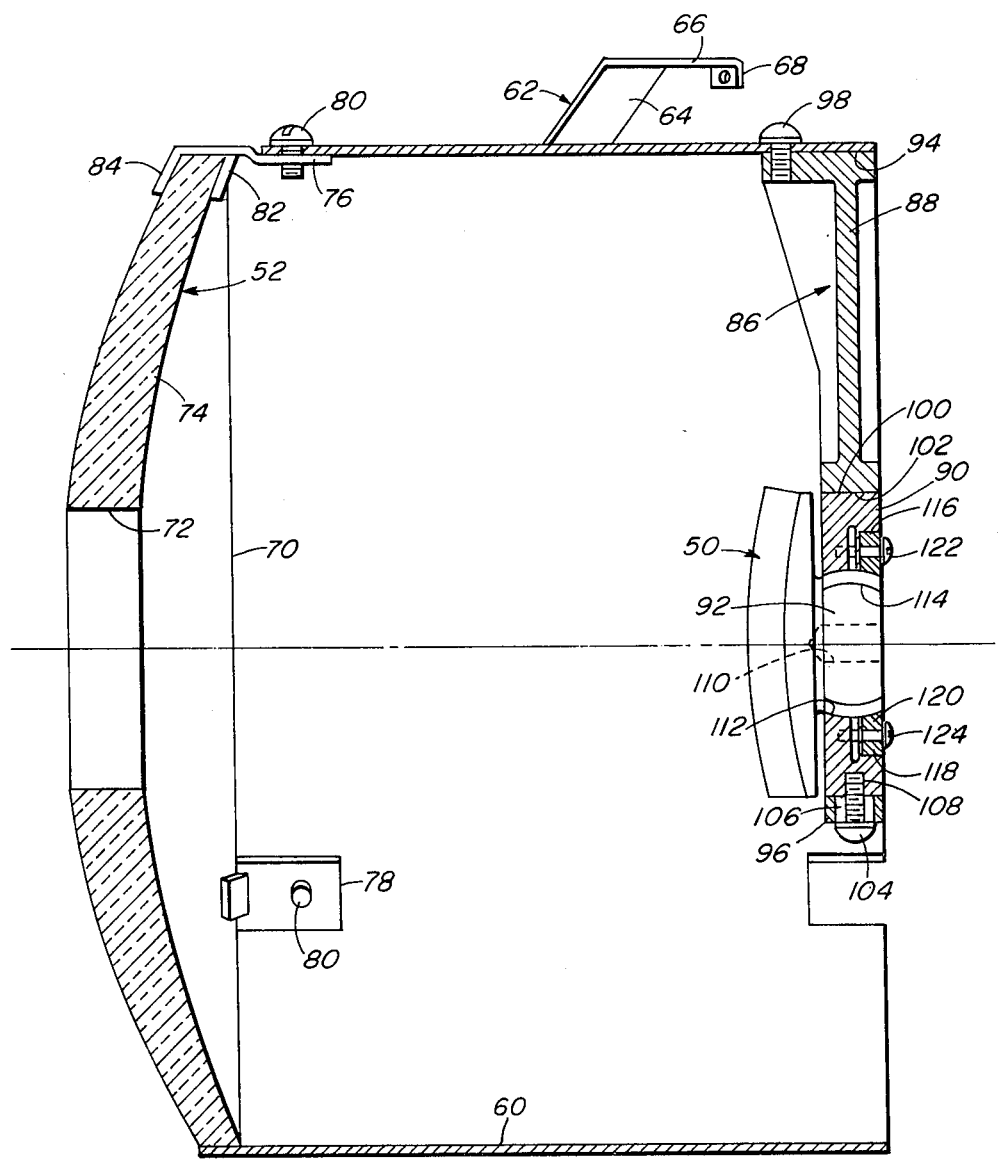
FIG. 2 is a cross-sectional view of a sub-assembly of the system of FIG. 1, taken along a plane through an axis of one of the color separation assemblages of FIG. 1.

Generally, the television projection system of FIGS. 1 and 2 comprises three color separation assemblages 20, 22, 24, which are controlled by an electronic system 26 and which are held in adjustable orientation with respect to each other by a mechanical mount 28. As shown in assemblage 24 (which is broken away), each of assemblages 20, 22, 24 includes an evacuated cathode ray tube 32 having a rearward elongated tubular portion 34 and a forward expanded portion having a forward optically clear face 36. A cathode ray, i.e. an electron beam, 38 is generated and controlled at the rearward extremity of tubular portion 34 by a thermionic cathode at 40, an electron accelerating anode at 42, a focusing coil at 44, and X and Y axis electromagentic coils at 46, 48. Within the forward portion of the cathode ray tube and adjacent to face 36 is a generally rectangular phosphor target 50, on which electron beam 38 sweeps to define a raster. Rearwardly within the forward expanded portion of the cathode ray tube is a centrally apertured converging reflector 52. Forwardly mounted with respect to face 36 of the cathode ray tube is a corrector plate, i.e. a corrector lens 54. The geometrical centers of mirror 52, target 50 and plate 54 are disposed along an optic axis which coincides with the axis of the electron gun. The axes of color separation assemblages 20, 22, 24 converge to a point on a viewing screen 55.

In the present example, the phosphor target of assemblage 20 emits only red light, the phosphor target of assemblage 22 emits only green light and the phosphor target of assemblage 24 emits only blue light. In each case the magnitude of the current of impinging electron beam 38 is low, ranging from 50 to 100 micro-amperes, in comparison to the 100 to 400 micro-amperes of conventional television tubes. Electronic control circuit 26 maintains a constant current input to accelerating anode 42 and to focus coil 44 of each of assemblages 20, 22, 24 in order to minimize instantaneous raster spot size variation and thereby to enhance image resolution and uniformity throughout the phosphor target surface. As shown in FIG. 1A, superior performance is achieved in each of the three phosphor targets by a phosphor face provided by a sub-stratum 56 composed of aluminum, an intermediate stratum 58 composed of a copper-nickel alloy, and an outer phosphor coating 59. Phosphor coating 59, for example, contains a mixture of one or more phosphors, such as zinc sulfide and cadmium sulfide, and one or more activators or coactivators, such as sodium, lithium, silver, copper, gold, chlorine, aluminum, scandium, gallium and indium. Registered images of these phosphor targets are projected onto viewing screen 55 at a magnification of 25 to 29 times and preferably 27 times.

As shown in FIG. 2, converging mirror 52 and phosphor target 50 are mounted within the cathode ray tube by a tubular metal, typically aluminum, can 60 having an axis that coincides with the optic axis. Metal can 60 is mounted within the cathode ray tube by three folded leaf springs, spaced at 120° intervals about the axis, one of which is shown at 62. Each of these leaf-springs includes a forwardly inclined inner portion 64, a longitudinally extending intermediate portion 66 and a reversely bent outer portion 68. Inner portion 64 is welded to can 60. Intermediate portion 66 presses against the tubular inner periphery of the extended portion of the cathode ray tube. And outer portion 68 is positioned by a stud (not shown) that is affixed to the cathode ray tube forwardly of portion 68 and that extends into the aperture in portion 68. Mirror 52, which has a circular outer profile 70 and a circular central opening 72, is composed of glass and has a front surface 74 that is aluminized. Mirror 52 is fixed at the rear of can 60 by three steel spring clips, spaced 120° apart about the axis, two of which are shown at 76, 78. Each of these spring clips includes a forward portion with a threaded aperture, into which is turned a screw 80 that extends through an opening in can 60. Each of these springs includes a rearward portion having a center lug 82 that abuts against the forward concave surface of mirror 52 and a pair of rearward lugs, one of which is shown at 84, that straddle lug 82 and that abut against the rearward convex face of mirror 52.

In accordance with the present invention, phosphor target 50 is carried by a mount 86, by which it can be pivoted through a limited arc in any direction with respect to the optic axis and by which it can be reciprocated through a limited distance along the optic axis. Mount 86 includes a leg 88 that is predeterminedly fixed to can 60, a reciprocable support 90 carried axially by the spider, and a pivotable support 92 carried axially by the reciprocable support, all composed of aluminum. Spider 88 consists of a single post having an outer foot portion 94 and an inner bearing portion 96. Foot portion 94 has an outer surface in the shape of a cylindrical arc of the same radius as the inner cylindrical surface of can 60 so that the two surfaces seat together predeterminedly. Foot portion 94 is fastened to can 60 by a screw 98 which projects through an opening in can 60 and is turned into a threaded bore in foot portion 94. Bearing portion 96 presents a smooth inner cylindrical bearing surface 100 having an axis that coincides with the optic axis of mirror 52. Reciprocable support 90 presents a smooth outer cylindrical bearing surface 102, having a radius approximately equal to the radius of cylindrical bearing surface 100, so that support 90 acts as a precision slide with respect to spider 88.

The longitudinal position of support 90 along the optic axis is fixed by a screw 104, which extends through a longitudinal slot 106 in bearing portion 96 and is turned into a threaded bore 108 in the bearing portion of support 90. Slot 106 extends longitudinally along the optic axis and the head of screw 104 abuts against the edges of the slot when tightly locked.

The angular orientation of support 92 with respect to the optic axis is adjustable by a tool which fits into a bore 110. Support 92 has a spherical zonal bearing surface 112 and support 90 has an inner spherical zonal bearing surface 114, the radii of these bearing surfaces being the same. Mount 90 has a rearward cut-out cylindrical depression 116 which receives a lock ring 118. Lock ring 118 has an inner spherical zonal bearing surface 120 which is locked against bearing surface 144 by a pair of screws 122, 124, each of which projects through a smooth bore in lock ring 118 and is turned into a threaded bore in support 90.

A PREFERRED OPTICAL DESIGN

While this invention is not limited solely to the use of the Schmidt type optical system, it is described here in some detail as a preferred embodiment of this present disclosure. The Schmidt type of optical system lends itself ideally to this particular application since it uses a minimum number of optical components, only two, for maximum energy transmission and it provides a curved focal surface which means the usual fall-off in energy transmission will be reduced to cosine third rather than the cosine fourth term. The Schmidt system uses a spherical primary mirror which contributes a substantial amount of spherical aberration, particularly at very fast operational speeds. In this case, the system is designed to operate near the limit of f/0.6. At this speed, the spherical mirror, by itself, would introduce unacceptable spherical aberration which must be corrected by the thin aspheric correcting plate. This plate is located at the center of curvature of the primary mirror. Since the system aperture stop is also located at the center of curvature of the primary mirror, then all the Seidel monochromatic errors of the spherical mirror are automatically eliminated, leaving only a residual Petzval curvature. In this case, the phosphor target is curved to match the Petzval surface so that this remaining error is completely nullified. The only residual errors remaining are those due to the thin aspheric corrector itself. These constitute a chromatic variation of spherical with wavelength, and certain higher order forms of astigmatism, or oblique spherical, due to the fact that the off-axis bundles of energy are not incident on the aspheric profile at the same angles as the on-axis bundles.

Obviously, since the aspheric corrector is merely used to annul the spherical aberration of the primary mirror, a variety of aspheric profiles could be used. The best form for minimizing residual color errors is obtained by using a plate profile which goes through a point of inflection at about the 75% zone. This shape introduces the smallest amount of slope gradient to the profile which tends to balance the over-all residual color errors.

From this discussion, it is evident that the Schmidt system construction is excellent for this application. It provides superior performance characteristics with a minimum number of optical components and maximum energy transfer at fast operational speeds. The main disadvantage is that the residual errors are not balanced over the working field of view but tend to increase towards the edge of the angular field. This feature is probably of reduced significance for this application, however, since the dominant scene action ordinarily occurs at the center of the field. Activity of lesser importance usually occurs at the edge of the field and the observor will ordinarily not detect any lack of sharpness in the screen image since he is concentrating his attention at the center of the field. Therefore, any slight degradation of image quality at the edges of the viewing screen may be disregarded since they do not distract the audience's attention.

Figure 3:
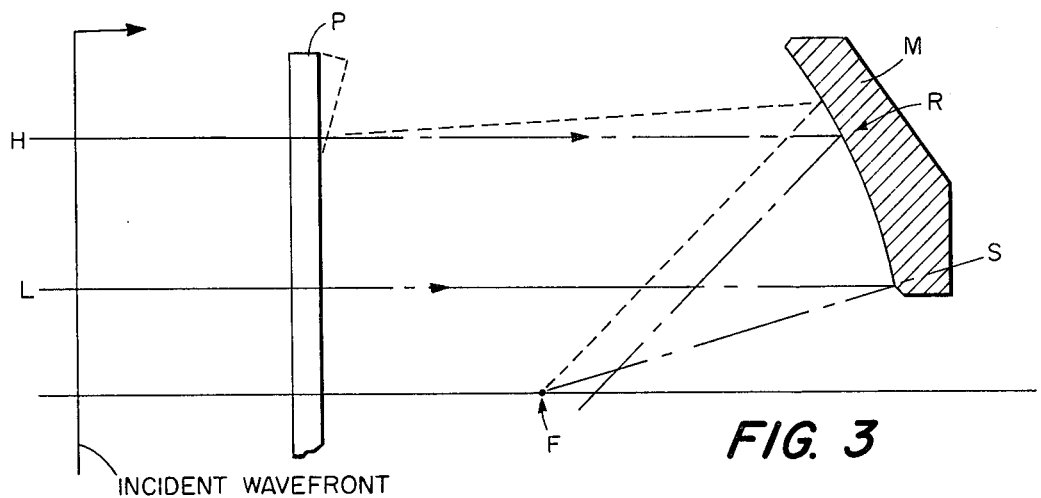
FIG. 3 is a diagram illustrating certain optical principles of the present invention.

In connection with the embodiment of FIGS. 1 and 2, a brief detailed discussion of classical Schmidt design procedure follows. In FIG. 3 an aspheric profile is considered to be coincident with the aperture stop, both located then at the center of curvature of the spherical mirror M. A plane wave front is incident on this aspheric plate, from the left. Since the aperture stop is located at the center of curvature, the spherical mirror introduces no coma or astigmatism. Therefore, the remaining aberration, spherical aberration, is eliminated by use of an aspheric correcting profile on the plate P. If plate P is absent, then the marginal ray $\overline{HR}$ will focus at a point on the optical axis inside the par-axial focus F. Assuming that $\overline{LS}$ represents a par-axial ray on the incident wave front, it will come to focus at the par-axial image point F. Now, obviously, it is necessary to cause the marginal ray $\overline{HR}$ to be deviated outwards so as to focus at the same point F, in order to achieve stigmatic imagery. This may be done by introducing a prism-like action on the ray, produced by the aspheric profile on the Plate P. Now, using Fermat's principle, the plate profile may be determined, considering equal optical paths for perfect imagery at point F. Here, the optical path difference, $OPD_M$, between the two ray paths $\overline{HR} + \overline{RF}$ and $\overline{LS} + \overline{SF}$ is given by:

$$OPD_M = \frac{\rho^4}{4r^3} - \frac{\rho^6}{8r^5} + \quad \text{Equation 1}$$

Where $r$ is the mirror radius of curvature and $\rho$ is the zonal height in the aperture. Using Fermat's principle, it may be stated that the marginal ray path $\overline{HR} + \overline{RF}$ will not change appreciably even after the plate is introduced. Therefore, Equation 1 is still valid for the OPD not due to the plate. If $OPD_p$ is the added path difference due to the plate, then:

$$OPD_p = (N - 1) t_p \quad \text{Equation 2}$$

where $t_p$ = thickness at zonal height $\rho$ so, $$OPD_{M + P} = (N - 1) t + \frac{\rho^4}{4r^3} \quad \text{Equation 3}$$

This expression, of course, is valid only for Seidel aberration correction which means fairly slow optical systems, about f/6.3. This explanation and development is intended solely to demonstrate the principles involved. From Equation 2, the optical path difference will become zero if:

$$t_\rho = \frac{\rho^4}{(N - 1) 32 f^3} \quad \text{Equation 4}$$

where $f$ = mirror focal length

From this expression, the plate thickness would increase proportionally to the fourth power of the zonal radius, assuming zero thickness on-axis. Since the plate must have some base thickness value, even on-axis, the above expression would increase monotonically producing a substantial amount of chromatic aberration. Now, by introducing a weak plano-convex lens effect into this correcting plate, the color error may be minimized. Additionally, this lens will add positive power to the primary mirror so that the focus will move slightly away from the par-axial focus and nearer the primary mirror. This will be point $F^1$ in FIG. 3. Also, there will be a point of inflection near the marginal edge of the plate where no ray deviation will occur. Now, for mirrors of slow speed, perhaps f/5.6, the principal residual error is Seidel spherical aberration causing the marginal rays to focus at a position given by:

$$\frac{\rho_M^2}{8f} \quad \text{Equation 5}$$

where $\rho_M$ = marginal ray height

However, it is known that the minimum blur circle diameter focus will occur at a position which is about three-fourths of this amount, or $$\frac{3\rho_M^2}{32f} \quad \text{Equation 6}$$

Now, if the aspheric plate profile is adjusted to focus the incident wave front at this common focus, then the slope gradient curve of the plate will be a minimum and so will the color errors. Now, the total OPD at this common focus is given by:

$$OPD = (N - 1) t_p + \rho^2 \left[ \frac{3/2 \rho_M^2}{32 f^3} \right] - \rho^4/32 f^3 \quad \text{Equation 7}$$

This optical path difference will become zero if the following condition is obeyed:

$$t_p = \frac{\rho^4 - 3/2 \rho_M^2 \rho^2}{32(N - 1) f^3} \quad \text{Equation 8}$$

The above expression is intended to be modified by adding a constant amount so that a point of inflection will occur at about the three-fourth marginal zone. The plate will then assume the conventional geometry of the classic Schmidt corrector plate.

A more detailed analysis of this plate and mirror combination indicates that the chief residual errors occurring off-axis are a combination of "oblique spherical aberration" and higher order astigmatism. Suitable expressions for these residuals are easily derived by assuming that the edge zones of the corrector plate are actually very thin prisms, in any given azimuth. Therefore, calling the angular deviation of any given ray, $\theta$, we have to give a good approximation:

$$\theta = (N - 1)\alpha \left( 1 + \frac{N + 1}{2N} \omega^2 + \ldots \right) \quad \text{Equation 9}$$

where $N$ = refractive index of plate
$\theta$ = angular deviation
$\alpha$ = prism wedge angle
$\omega$ = angular incidence of ray on prism face For small plate slope angles, the plate angle $\alpha$ is given by the differential of Equation 8:

$$\text{So}: \alpha = \delta t \rho / \delta \rho \qquad \text{Equation 10}$$

$$\therefore \alpha = \frac{4\rho^3 - 3\rho_M^2 \rho}{32(N-1)f^3} \qquad \text{Equation 11}$$

At the maximum slope angle, $\rho_M = \rho$, and $$\therefore \alpha = \frac{\rho_M^3}{32(N-1)f^3} \qquad \text{Equation 12}$$

Figure 4:
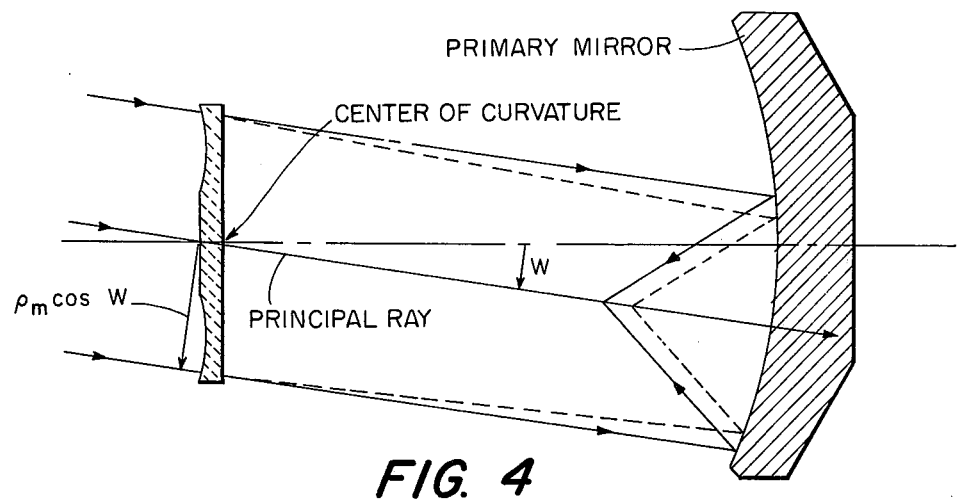
FIG. 4 is another diagram illustrating certain optical principles of the present invention.

From FIG. 4, the perpendicular distance from the principal ray to the marginal ray, measured at the aspheric vertex is $\rho_M \cos \omega$. Now, from Equation 12, the angular plate value of the marginal ray will be given by the series expansion:

$$\alpha \rho_M = \frac{\rho_M^4}{32(N-1)f^3}\left(1 - \frac{9\omega^2}{2} + \ldots\right) \qquad \text{Equation 13}$$

Since the corresponding ray deviation is obtained from Equation 9, then Equation 13 must be multiplied by $(N-1)$ to give:

$$\theta = \frac{(N-1)\rho_M^4}{32(N-1)f^3}\left(1 - \frac{9\omega^2}{2} + \ldots\right) \qquad \text{Equation 14}$$

This is the deviation required to produce stigmatic imagery for the marginal, on-axis ray. From FIG. 4, the marginal rays, upper and lower on the plate, will experience angular deviations given by:

$$\theta_M = (N-1)\alpha \rho_M \left(1 + \frac{N+1}{2N}\omega^2 + \ldots\right) \qquad \text{Equation 15}$$

$$\text{or } \theta_M = \frac{(N-1)\rho_M^4}{32(N-1)f^3}\left(1 + \frac{N+1}{2N}\omega^2 + \ldots\right) \qquad \text{Equation 16}$$

This last expression thus permits an approximate measure of the residual off-axis aberration produced by the aspheric correcting plate. Subtracting the angular deviations of the off-axis marginal rays from the deviation due to the on-axis marginal rays gives:

$$\theta_M - \theta = \frac{\rho_M^4 \omega^2}{32 f^3}\left(\frac{N+1}{2N} + \frac{9}{2}\right) + \ldots \qquad \text{Equation 17}$$

or, combining:

$$\theta_M - \theta = \frac{\eta_M^4 \omega^2}{64 f^3}\left[\frac{10N+1}{N}\right] \text{ neglecting } \omega^4 \text{ terms} \qquad \text{Equation 18}$$

It is a simple matter now to obtain the separation distance of these two rays in the focal surface by multiplying by $f$ since this radial distance is equal to $f\theta$. Therefore, this lateral error which is called "oblique spherical" is given by:

$$\frac{\rho_M^4 \omega^2}{64 f^2}\left[\frac{10N+1}{N}\right] \qquad \text{Equation 19}$$

A Modified Preferred Embodiment

In another embodiment of this optical system, even the aforementioned residual error is further reduced by the following modification of the classical Schmidt construction:

a. An addition of a light aspheric figuring to the primary mirror;
b. A slight change in the profile of the aspheric corrector plate; and
c. An adjustment of the aspheric plate towards the mirror.

These adjustments introduce small, controlled amounts of Seidel spherical and astigmatism to balance the field errors. However, the classical physical configuration is considered as an adequate design for the application described in the opening paragraph.

Figure 5:
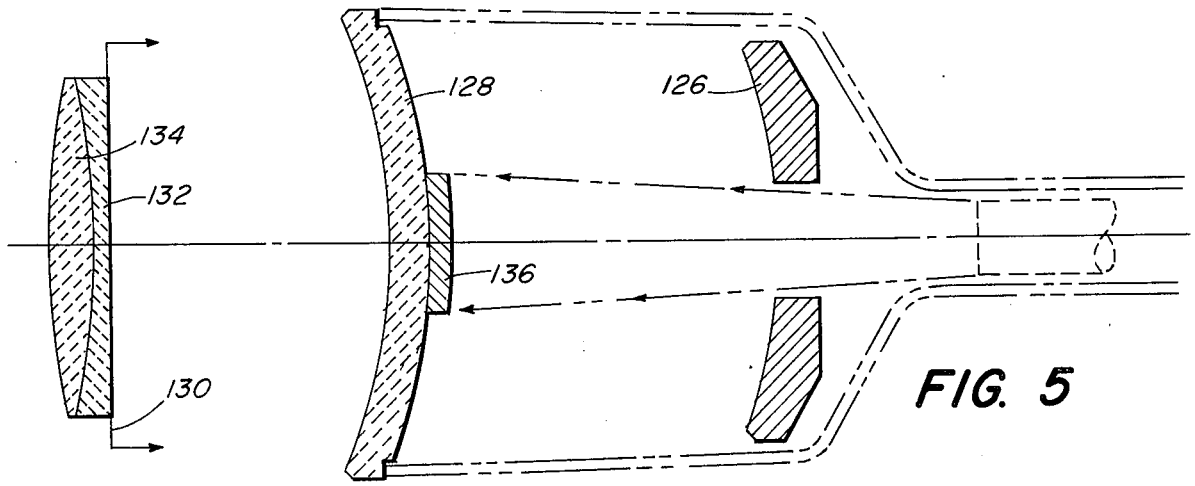
FIG. 5 illustrates a modified optical system of the present invention.

The Embodiment of FIG. 5

Another system configuration which provides a higher level of image quality is shown in FIG. 5. This construction may be described as a meniscus Schmidt system. As noted previously, the classic Schmidt corrector plate is designed to correct all orders of spherical aberration and minimize the color errors it introduces.

This effect is achieved, but higher-order off-axis errors are introduced: namely, 5th order lateral spherical aberration and astigmatism. In the example shown in FIG. 5, the Seidel errors of a primary spherical mirror 126 are corrected by a concentric meniscus lens 128. Then, with aperture stop at the center of curvature of the primary mirror, the residual limiting errors are higher order spherical abberation, of uniform magnitude across the field, and color errors. The system has no other monochromatic errors. It is a straight-forward matter then to remove the higher ordered spherical aberration by introducing an appropriate aspheric correcting plate at the aperture stop position 130. The last remaining color errors are then eliminated by chromatizing this correcting plate, as shown, with a doublet construction 132, 134 of two materials comprising a dispersion difference of about 30, and having the same mean refractive index. This example does not require as much asphericity as the standard Schmidt plate, and is, therefore, easier to fabricate.

It should be noted, also, that this construction is ideally adapted for a sealed projection system since the meniscus lens is designed to serve two important functions, namely, to seal the CRT tube and to serve as a support for the target surface 136. The second of these advantages eliminates the necessity of a separate spider support for the phosphor target and, therefore, results in improved energy conservation for the optical system.

Operation

There are numerous related advantages of using 3 single, mutually color independent, sealed video projection systems. Since each phosphor is intended for a single color excitation, the granular size may be selected for optimum resolution and maximum energy output. The purity of the spectral response range is inherently higher due to a lowered beam load level. Therefore, the electron density on the phosphor surface is decreased so that the phosphor material is run well below its saturation level. The resolution is improved for the system because a smaller deflection angle is required for these small target sizes. This results in a more linear scan and a reduced non-linear, or "bunching" effect, of the electron density across the target face during the scan trace. The implosion protection level of this type of sealed construction is vastly enhanced due to the manner of sealing the optical components within the tube envelope. The focus voltage and acceleration voltage are regulated to maintain a constant input to the focus coil which minimizes spot size variation and enhances resolution and image uniformity across the phosphor target surface. The focus coil is adjusted for only one beam, which leads to a high precision adjustment for each tube. The specially developed method of applying a narrow spectral band phosphor upon a target substrate material of aluminum and a copper-nickel alloy layer secures greater adhesion and, therefore, increases durability of the phosphor coating. The single post, spider support for the target surface within a sealed cathode ray tube reduces the amount of surface area obstruction and thus increases the amount of energy directed toward the viewing screen. The cantilevered spring clips securely fasten the primary mirror within a sealed cathode ray tube. Full tilt adjustments and longitudinal focusing of the phosphor target surface are achieved prior to enclosure within the cathode ray tube.

Since certain changes may be made in the present disclosure without departing from the invention involved, it is intended that all matter contained in the foregoing specification or shown in the accompanying drawing be interpreted in an illustrative and not in a limiting sense.

What is claimed is:
1. A television projector comprising a plurality of color separation assemblages, each including, along an optic axis:
   a. forwardly directed electron source means;
   b. rearwardly directed phosphor target means;
   c. forwardly directed converging mirror means having an aperture;
   d. forwardly positioned corrector means;
   e. evacuated envelope means;
   f. said electron source means, said mirror means and said target means being disposed in said envelope means;
   g. said electron source means, said mirror means, said target means and said corrector means being disposed along an optic axis;
   h. first mounting means including only a single post portion extending radially toward said optic axis and a bearing portion having an inner cylindrical bearing surface with an axis coinciding with the optic axis;
   i. second mounting means having an outer cylindrical bearing surface and an inner spherical bearing surface, said outer cylindrical bearing surface being slidable within said inner cylindrical bearing surface;
   j. third mounting means having an outer spherical bearing surface being pivotally seated in said inner spherical bearing surface, said third mounting means carrying said target means;
   k. first screw means for locking said second mounting means with respect to said first mounting means; and
   l. second screw means for locking said third mounting means with respect to said second mounting means.

2. The television projector of claim 1 wherein said mirror means is spheric.

3. The television projector of claim 1 wherein said mirror means is aspheric.

4. The television projector of claim 1 wherein said phosphor target means includes an aluminum substrate, a copper-nickel alloy intermediate stratum and a phosphor coating stratum.

5. The television projector of claim 1 wherein mirror means and said correction means constitutes a catadioptric Schmidt system.

6. The television projector of claim 1 wherein said corrector means has points of inflection at approximately the three-fourth marginal zone.

7. The television projector of claim 1 wherein the said electron source means is characterized by a focal voltage and an acceleration voltage that are constant.

8. A television projector comprising a plurality of color separation assemblages, each including, along an optic axis:
   a. forwardly directed electron source means;
   b. rearwardly directed phosphor target means;
   c. forwardly directed converging mirror means having an aperture;
   d. forwardly positioned corrector means;
   e. evacuated envelope means;
   f. said electron source means, said mirror means and said target means being disposed in said envelope means;
   g. said electron source means, said mirror means, said target means and said corrector means being disposed along an optic axis;
   h. first mounting means including only a single post portion extending radially toward said optic axis and a bearing portion having an inner cylindrical bearing surface with an axis coinciding with the optic axis;
   i. second mounting means having an outer cylindrical bearing surface and an inner spherical bearing surface, said outer cylindrical bearing surface being slidable within said inner cylindrical bearing surface;
   j. third mounting means having an outer spherical bearing surface being pivotally seated in said inner spherical bearing surface, said third mounting means carrying said target means;
   k. first screw means for locking said second mounting means with respect to said first mounting means;
   l. second screw means for locking said third mounting means with respect to said second mounting means;
   m. tubular can means in said envelope means for carrying said first mounting means;
   n. at least three spring elements extending from said can means and biased towards said envelope means.

9. The television projector of claim 8 wherein said mirror means is spheric.

10. The television projector of claim 9 wherein said mirror means is aspheric.

11. The television projector of claim 10 wherein said phosphor target means includes an aluminum substrate, a copper-nickel alloy intermediate stratum and a phosphor coating stratum.

12. The television projector of claim 11 wherein mirror means and said corrector means constitutes a catadioptric Schmidt system.

13. The television projector of claim 12 wherein said corrector means has points of inflection at approximately the three-fourth marginal zone.

14. The television projector of claim 13 wherein the said electron source means is characterized by a focal voltage and an acceleration voltage that are constant.

15. A television projector comprising a plurality of color separation assemblages, each including, along an optic axis:
  a. a forwardly directed electron gun;
  b. a rearwardly concave phosphor target;
  c. a forwardly directed converging mirror having a central aperture;
  d. a forwardly positioned corrector plate;
  e. an evacuated glass envelope;
  f. said electron gun, said mirror and said target being disposed in said envelope;
  g. said electron gun, said mirror, said target and said corrector plate being disposed along an optic axis;
  h. a first mount including only a single post portion extending radially toward said optic axis and a bearing portion having an inner cylindrical bearing surface with an axis coinciding with the optic axis;
  i. a second mount having an outer cylindrical bearing surface and an inner spherical bearing surface, said outer cylindrical bearing surface being slidable within said inner cylindrical bearing surface;
  j. a third mount having an outer spherical bearing surface being pivotally seated in said inner spherical bearing surface, said third mount carrying said target;
  k. a first screw for locking said second mount with respect to said first mount;
  l. a plurality of second screws for locking said third mount with respect to said second mount;
  m. a tubular can in said envelope for carrying said first mount;
  n. at least three leaf springs extending from said can and biased toward said envelope;
  o. said first mount, said second mount, said third mount, said can and said leaf spring being composed of metal;
  p. said target including an aluminum substrate, a copper-nickel alloy intermediate stratum and a phosphor coating stratum.

16. A television projector comprising a plurality of color separation assemblages, each including, along an optic axis:
  a. forwardly directed electron source means;
  b. rearwardly directed phosphor target means;
  c. forwardly directed converging mirror means having an aperture;
  d. forwardly positioned corrector means;
  e. evacuated envelope means;
  f. said electron source means, said mirror means, said target means and said corrector means being disposed along an optic axis;
  g. first mounting means including post means extending radially toward said optic axis and a bearing portion having an inner cylindrical bearing surface with an axis coinciding with the optic axis;
  h. second mounting means having an outer cylindrical bearing surface and an inner spherical bearing surface, said outer cylindrical bearing surface being slidable within said inner cylindrical bearing surface;
  i. third mounting means having an outer spherical bearing surface being pivotally seated in said inner spherical bearing surface, said third mounting means carrying said target means;
  j. first screw means for locking said second mounting means with respect to said first mounting means; and
  k. second screw means for locking said third mounting means with respect to said second mounting means.

* * * * *